(12) United States Patent
Henriksson et al.

(10) Patent No.: US 9,891,840 B2
(45) Date of Patent: Feb. 13, 2018

(54) METHOD AND ARRANGEMENT FOR CONTROLLING REQUESTS TO A SHARED ELECTRONIC RESOURCE

(71) Applicant: HUAWEI TECHNOLOGIES CO., LTD., Shenzhen (CN)

(72) Inventors: Tomas Henriksson, Kista (SE); Darren Barnard, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/146,421

(22) Filed: May 4, 2016

(65) Prior Publication Data

US 2016/0246515 A1 Aug. 25, 2016

Related U.S. Application Data

(63) Continuation of application No. PCT/EP2013/073004, filed on Nov. 5, 2013.

(51) Int. Cl.
*G06F 12/00* (2006.01)
*G06F 3/06* (2006.01)
*G06F 9/50* (2006.01)

(52) U.S. Cl.
CPC .......... *G06F 3/0611* (2013.01); *G06F 3/0629* (2013.01); *G06F 3/0673* (2013.01); *G06F 9/5011* (2013.01)

(58) Field of Classification Search
None
See application file for complete search history.

(56) References Cited

U.S. PATENT DOCUMENTS

| 7,596,647 B1 | 9/2009 | Van Dyke et al. |
| 8,046,559 B2 | 10/2011 | Zheng et al. |
| 2005/0060456 A1 | 3/2005 | Shrader et al. |

(Continued)

FOREIGN PATENT DOCUMENTS

| EP | 0 834 168 B1 | 10/1999 |
| EP | 2 431 884 A1 | 3/2012 |

(Continued)

OTHER PUBLICATIONS

International Search Report and the Written Opinion of the International Searching Authority dated Jul. 17, 2014 in corresponding International Patent Application No. PCT/EP2013/073004.

(Continued)

*Primary Examiner* — Baboucarr Faal
(74) *Attorney, Agent, or Firm* — Staas & Halsey LLP

(57) ABSTRACT

A method and a resource controller for controlling requests to a shared electronic resource, is described. The requests are arranged in the queue together with a counter which is set to a predetermined start value, the requests are served in an order chosen to take account of the number of commands necessary to process the requests in the queue, the service of each request is performed together with a decrement or increment of the counters for all requests which have been a longer time in the queue than the request that is served, and the request, which has been in the queue for the longest time of the requests in the queue is served when the counter of the that request has reached a predetermined limit value.

19 Claims, 4 Drawing Sheets

(56) References Cited

U.S. PATENT DOCUMENTS

| | | | |
|---|---|---|---|
| 2005/0165930 A1* | 7/2005 | Whitman, Jr. | ... G06Q 10/06311 709/226 |
| 2009/0031314 A1 | 1/2009 | Moscibroda et al. | |
| 2009/0132736 A1 | 5/2009 | Hasan et al. | |
| 2010/0095036 A1* | 4/2010 | Mittal | ................. G06F 13/366 710/117 |
| 2012/0059962 A1 | 3/2012 | Lai | |
| 2012/0072679 A1 | 3/2012 | Biswas et al. | |
| 2012/0331226 A1 | 12/2012 | Krishnan et al. | |

FOREIGN PATENT DOCUMENTS

| | | |
|---|---|---|
| EP | 2 232 376 B1 | 4/2016 |
| WO | WO 2011/130547 A1 | 10/2011 |

OTHER PUBLICATIONS

International Search Report dated Jul. 17, 2014, in corresponding International Patent Application No. PCT/EP2013/073004.

* cited by examiner

METHOD AND ARRANGEMENT FOR CONTROLLING REQUESTS TO A SHARED ELECTRONIC RESOURCE

CROSS REFERENCE

This application is a continuation of International Application No. PCT/EP2013/073004, filed on Nov. 5, 2013 which is incorporated herein by references in its entirety.

TECHNICAL FIELD

The present disclosure relates to shared electronic resources. More specifically the present disclosure relates to a method and arrangement for controlling the processing of requests to the shared electronic resource.

TECHNICAL BACKGROUND

Requests to shared resources in an electronic processing device must be controlled in order to provide a guarantee for the service for the individual service users in a category that as a whole has guaranteed latency rate service, which is defined below, and a high efficiency of the shared resource. An example of a shared resource in an electronic processing device is a memory. Electronic processing devices may comprise one or more processors. Said processors need to be connected to a memory in order to be able to execute a program. Many different types of memories exist. One type of memory that is commonly used is Dynamic Random Access Memory (DRAM). In a DRAM, only a limited number of memory rows per memory bank, typically only one memory row per memory bank, are accessible at a given time either for reading or writing. In order to change between rows which are accessible commands have to be sent to the DRAM. In order to switch between reading from the memory and writing to the memory, the memory controller must wait several clock cycles. A processor that is adapted to be connected to a DRAM usually has a DRAM controller arranged on the same chip as the processor. The DRAM controller is arranged to control one or more DRAM (s) connected to the DRAM controller by a DRAM interface. For the above mentioned reasons, queues of requests for memory access to the DRAM has to be re-ordered in order to be able to provide high efficiency. Some users of the shared resources benefit from a latency rate service. Latency rate service means that after time $\tau$ seconds in a busy period, at least $\max(0, (\tau-\theta) \times p)$ requests have been served, i.e., the maximum of 0 and $((\tau-\theta) \times \phi)$. $\theta$ is initial latency, i.e., the maximum delay in seconds between when the first request in a busy period is sent and when the request is served. $\rho$ is the rate, i.e. the minimum number of requests that are served per second. In case the processing device is set up to serve one request per clock cycle the rate is equal to the clock frequency of the processing device.

It is possible to use a simple up-down counter to guarantee the shared service for all such users, but the share to each individual user is not known and the initial latency for each individual user may be unlimited. For the case of DRAM controllers, the users are traffic flows and the traffic flows that should get similar service belong to the same traffic category. Bus arbitration techniques to reduce access latency are known from the prior art. The memory requests are scheduled based at least in part on desired latency.

It is known from the prior art to control the processing of requests of a first category having a first priority as well as controlling the processing of requests of a second category having a second priority. The priorities may change over time.

When there is no limitation for the re-ordering in the queue, the guarantee on the shared resource cannot be used to derive a guarantee for the service for the individual service users. A request from any user could then be overtaken by an unlimited number of later arriving requests which would lead to starvation, i.e., to a request never receiving any service. Overtaking means that a later request is served before an earlier request. The trivial solution to use an in-order First-In-First-Out (FIFO) queue has the flaw that it does not allow high efficiency of the shared resource, at least in the case of an interface to a DRAM of the type Double Data Rate (DDR), which is a well known standard. This is especially true for higher frequency DRAM:s of the types called DDR3 and DDR4, which are later standards of DDR.

Previous attempts to provide starvation-free service include an ageing mechanism and a timeout mechanism for memory request reordering. The ageing mechanism increases the priority of requests as the requests get older. When a request has reached the highest priority the timeout mechanism masks all other requests to make sure that the highest priority request will be served.

Another previous attempt uses FIFO service order to provide latency-rate guarantee per traffic flow. Only Read (RD) and Write (WR) commands are here kept in order. Precharge (PRE) and Activate (ACT) commands may be issued in advance using a technique called look ahead.

All previous attempts suffer from insufficient efficiency of the DRAM for high demand users.

SUMMARY OF THE DISCLOSURE

An object of the present disclosure is to provide a method for offering a latency-rate guarantee to a shared electronic resource for multiple traffic flows.

Another object of the present disclosure is to provide a method which provides an efficient use of the resource while still providing a service guarantee for some service requesters.

Still another object of the present disclosure is to provide a resource controller for a shared electronic resource which provides a latency-rate guarantee to a shared electronic resource for multiple traffic flows.

Yet another object of the present disclosure is to provide a resource controller for a shared electronic resource which provides an efficient use of the resource, while still providing a service guarantee for some service requesters.

The object of the present disclosure is primarily to provide a method and a device according to the above, when the shared resource is a memory, primarily when the memory is a Dynamic Random Access Memory (DRAM).

At least one of these objects is fulfilled with a method or a controller according to the independent claims.

Further advantages are provided with the features in the dependent claims.

The presented method for controlling requests to a shared electronic resource comprises the steps of receiving requests of at least a first category, determining whether the request is to be served immediately or to be arranged in a queue. The method is characterized in the steps of arranging the requests in the queue together with a counter which is set to a predetermined start value, in dependence of the determining step, and serving the requests in an order chosen to take account of the number of requests that are served per time unit, wherein the request which has been in the queue for the longest time of the requests in the queue is served when the counter of the request, which has been in the queue for the longest time of the requests in the queue, has reached a predetermined limit value. The method is further characterized in the steps decrementing or incrementing the counters for all requests which have been a longer time in the queue than the request that is served, each time a request is served.

It is favourable, when taking into account the number of requests that are served per time unit, to maximize the number. When taking account of the number of requests that are served per time unit, account may be taken to the number of commands that are necessary to process the requests in the queue for each one of the requests, respectively, and/or the total number of commands for all requests in the queue. In case the shared electronic resource is a memory and the resource is a memory controller connected to the memory with a bus, it is favourable to maximize the usage of the bus, i.e., to have a high efficiency of the bus.

The predetermined start value, the size of the decrement or increment and the predetermined limit value are all related. The time it takes for the counter to reach the predetermined limit value is dependent on the difference between the predetermined start value and the predetermined limit value and the size of the decrement or increment. Typically, the size of the decrement or increment is chosen to be 1.

The electronic resource may be any type of electronic resource but the main object of the present disclosure is to provide a solution for shared electronic resources in the form of memories. Electronic memories exist in a number of different forms such as, e.g., hard disk drives and semiconductor memories. The latter exist in different forms such as, e.g., read only memories and random access memories. The present disclosure is applicable to a kind of random access memories called Dynamic Random Access Memory (DRAM). In a DRAM information is arranged in banks which each comprise a number of rows.

For a DRAM the difference between the predetermined start value and the predetermined limit value is typically chosen to be in the interval 5-1000, preferably in the interval 10-100, when the size of the decrement or increment is chosen to be 1. Thus, 5-1000, preferably 10-100, requests may overtake the request, which has been in the queue for the longest time of the requests in the queue, before the counter for the request, which has been in the queue for the longest time of the requests in the queue, has reached the predetermined limit value.

The presented method provides a favourable solution to the problem of efficient use of a shared electronic resource, especially of a memory of the type DRAM. In DRAM:s either reading or writing may be performed at any one time. Furthermore, only one memory row from one bank may be read from or written to at any one time. This means that the efficiency of the memory usage increases by avoiding shifting between memory rows and shifting between read and write. For a DRAM, the number of commands for a series of requests is, thus, dependent on the order in which the requests are served. In case the prior request was a write request it is more favourable to serve another write request instead of a read request as the DRAM controller must wait some time between issuing a write command and a read command. This may be achieved by reordering of the requests to the memory. Use of FIFO service order resulted in acceptable efficiency for slow frequency DDR and DDR2 interfaces, but with modern higher frequency DDR3 and DDR4 interfaces the efficiency is unacceptably low when FIFO is used due to the function of DDR3 and DDR4. However, unlimited reordering leads to starvation which means that some requests are never processed. This may be solved by using timeout, but efficiency suffers from timeout as timeout prevents all but the timed out request from getting service. Also, ageing based on number of DDR bursts that overtake a request has been suggested. Ageing however does not provide any guarantee by itself. Ageing and timeout are typically discussed in the prior art for all requests in a DRAM controller.

The counter mechanism used by the herein disclosed method and resource controller is preferably used only for traffic flows of a specific category, i.e. the traffic flows that should be given a latency-rate guarantee. The ordering relationship with DDR bursts from other traffic flows may be performed in any known way.

The requests may arrive as parts of composed requests and wherein the method comprises the step of dividing the composed requests into requests when the composed requests are received. Thus, the method may be implemented for composed requests as well as single requests.

Each time a request is served, the counter may be decremented for each one of the requests, which have been in the queue for a longer time than the request which is served. The counter may be represented by a multi-bit number of which the most significant bit determines that the number is negative when it is high, and wherein the predetermined limit value is any negative number. Such a representation is favourable to combine with a decrement of the counter for each one of the requests which have been in the queue for a longer time than the one that is served, each time a request is served, because the combination will lead to a negative number which may be used as the predetermined limit value. A negative multi-bit number is easily detectable without using any comparator.

The method may be used for any shared electronic resource. However, according to an embodiment, the resource is a memory and the requests are memory requests.

The memory may be a Dynamic Random Access Memory (DRAM). The advantages of using the described method are especially large when it is used for controlling requests to a DRAM.

The requests may be processed in an order which minimizes the number of activate (ACT) and/or precharge (PRE) commands. The order is essential in order to maximize the use of the data bus and also to minimize the number of commands being used.

The first category of requests may be requests which correspond to requests from a display controller. Display controllers are one example on circuits that benefit from a latency-rate guarantee. If a latency-rate guarantee is not provided for a display controller, the screen, which the display controller controls, may display one or more black pixels.

The queue may be arranged in an electronic processing device. There are other alternatives for storage of the queue but preferably the queue is arranged in a memory controller which is arranged on a processor chip.

According to a second aspect, a resource controller for controlling requests to a shared electronic resource is provided. The resource controller is configured to receive requests of at least a first category, determine whether the request is to be served immediately or to be arranged in a queue. The resource controller is characterized in that said resource controller is configured to arrange the requests in the queue together with a counter which is set to a predetermined start value, in dependence of the determination.

The resource controller is also characterized in that it is configured to serve the requests in an order chosen to take account of the number of requests that are served per time unit, wherein the request which has been in the queue for the longest time of the requests in the queue is served when the counter of the request, which has been in the queue for the longest time of the requests in the queue, has reached a predetermined limit value and decrement or increment the counters for all requests which have been a longer time in the queue than the request which is served, each time a request is served.

The resource controller according to the second aspect provides the same advantages as the method according to the first aspect described above.

It is favourable, when taking into account the number of requests that are served per time unit, to maximize the number. When taking account of the number of requests that are served per time unit, account may be taken to the number of commands that are necessary to process the requests in the queue for each one of the requests, respectively, and/or the total number of commands for all requests in the queue. In case the shared electronic resource is connected to the memory with a bus, it is favourable to maximize the usage of the bus, i.e., to have a high efficiency of the bus.

The predetermined start value, the size of the decrement or increment and the predetermined limit value are all related. The time it takes for the counter to reach the predetermined limit value is dependent on the difference between the predetermined start value and the predetermined limit value and the size of the decrement or increment. Typically, the size of the decrement or increment is chosen to be 1.

The resource controller may be arranged so that the requests arrive as parts of composed requests and wherein the resource controller is arranged to divide the composed requests into requests when the composed requests are received.

The resource controller may be arranged to, each time a request is served, decrement the counter for each one of the requests which have been in the queue for a longer time than the request which is served. Furthermore, the counter may be represented by a multi-bit number of which the most significant bit determines the number is negative when it is high, and wherein the predetermined limit value is any negative number. Such a representation is favorable to combine with a decrement of the counter for each one of the requests which have been a longer time in the queue than the request which is served, each time a request is served. Such a combination will lead to a negative number which may be used as the predetermined limit value. A negative multi-bit number is easily detectable and is detectable without using a comparator.

The resource may be a memory and the requests may be memory requests. Furthermore, the memory may be a Dynamic Random Access Memory (DRAM). The advantages of using the resource controller are especially large when it is used for controlling requests to a DRAM, as is stated above.

For a DRAM the difference between the predetermined start value and the predetermined limit value is typically chosen to be in the interval 5-1000, preferably in the interval 10-100, when the size of the decrement or increment is chosen to be 1. Thus, 5-1000, preferably 10-100, requests may overtake the request, which has been in the queue for the longest time of the requests in the queue, before the counter for the request, which has been in the queue for the longest time of the requests in the queue, has reached the predetermined limit value.

The resource controller may be arranged to serve the requests in an order which minimizes the number of read activate (ACT) and/or precharge (PRE) commands. This is important in order to maximize the efficiency of the resource controller.

The resource controller may be arranged with the first category of requests being requests corresponding to requests from a display controller. Display controllers are examples on circuits that benefit from a latency-rate guarantee in order to function properly. If a latency-rate guarantee is not provided for a display controller, the screen, which the display controller controls, may display one or more black pixels.

According to a third aspect, an electronic processing device is provided which comprises a resource controller according to the second aspect.

According to a fourth aspect, user equipment is provided which comprises a resource controller according to the second aspect.

The resource controller may be implemented in any type of electronic processing device. An exemplary area of implementation is in a User Equipment (UE), also known as a mobile station, wireless terminal and/or mobile terminal, being is enabled to communicate wirelessly in a wireless communication network, sometimes also referred to as a cellular radio system. The communication may be made, e.g., between UEs, between a UE and a wire connected telephone and/or between a UE and a server via a Radio Access Network (RAN) and possibly one or more core networks.

The wireless communication may comprise various communication services such as voice, messaging, packet data, video, broadcast, etc.

The UE may further be referred to as mobile telephone, cellular telephone, computer tablet or laptop with wireless capability, etc. The UE in the present context may be, for example, portable, pocket-storable, hand-held, computer-comprised, or vehicle-mounted mobile devices, enabled to communicate voice and/or data, via the radio access network, with another entity, such as another UE or a server.

In the following preferred embodiments will be described with reference to the appended drawings.

DESCRIPTION OF PREFERRED EMBODIMENTS

Figure 1:
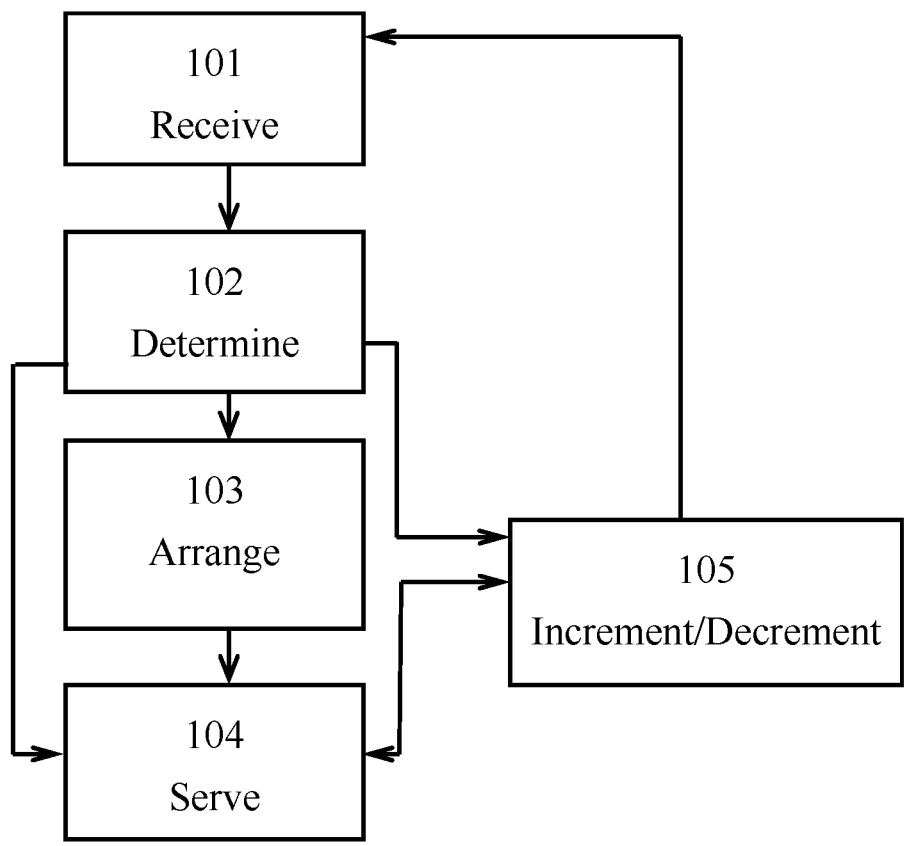
FIG. 1 shows schematically the steps of a method for controlling requests to a shared electronic resource.

In the following description of preferred embodiments the same reference numeral will be used for corresponding features in the different drawings.

FIG. 1 shows schematically the steps of a method for controlling requests to a shared electronic resource. Step 101 of the method comprises receiving requests of at least a first category. Step 102 of the method comprises determining whether the request is to be served immediately or to be arranged in a queue. In this step it is determined whether the counter of the request, which has been in the queue for the longest time, has reached a predetermined limit value. If this is the case the newly arrived request is arranged in the queue. In case the newly received request is to be served immediately this is achieved by jumping to step 104. Step 103 comprises arranging the request in a queue, together with a counter which is set to a predetermined start value. Step 104 comprises choosing a request to be served from the requests in the queue, taking account of the number of requests that may be served per time unit. In step 104 it is also determined whether the counter of the request, which has been in the queue for the longest time, has reached a predetermined limit value. If this is the case the request, which has been in the queue for the longest time, is served. Step 105 comprises decrementing or incrementing the counters for all requests which have been a longer time in the queue than the request that is served. The process then returns to step 101 or step 104 depending on whether a new request is received or not.

The determination of the order which is chosen for the requests may take into account the number of commands necessary to process all the requests in the queue or each individual request. The request to be served may be chosen to minimize the number of commands required to serve all the requests in the queue. Alternatively the request may be chosen based on which individual request that requires the lowest number of commands.

Figure 2:
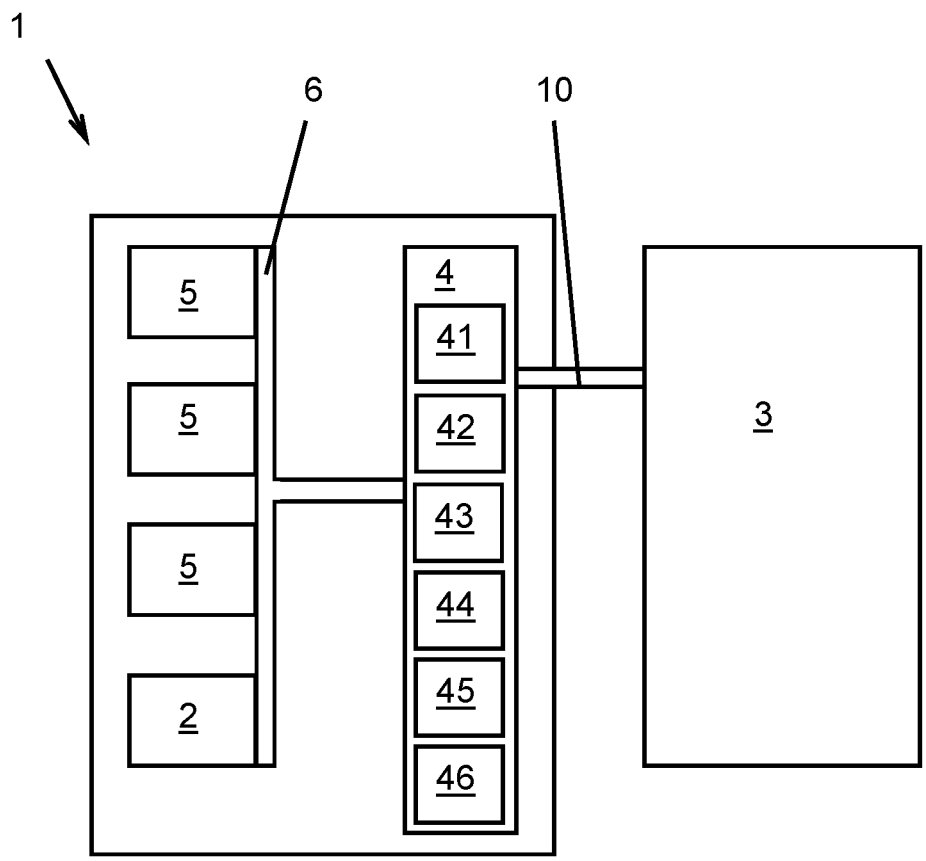
FIG. 2 shows schematically an electronic processing device which comprises a processor with a resource controller for controlling requests to a shared electronic resource.

FIG. 2 shows schematically a resource controller 4 for controlling requests 7 (FIG. 3) to a shared electronic resource 3, which resource controller 4 is configured to receive requests 7 (FIG. 3) of at least a first category, determine whether the request 7 (FIG. 3) is to be served immediately or to be arranged in a queue. The resource controller is also configured to arrange the requests 7 (FIG. 3) in the queue together with a counter which is set to a predetermined start value, in dependence of the determination. The resource controller is also configured to serve the requests 7 (FIG. 3) in an order chosen to take account of the number of requests that are served per time unit, wherein the request 7 (FIG. 3) which has been in the queue for the longest time of the requests 7 (FIG. 3) in the queue is served when the counter of that request 7 (FIG. 3) has reached a predetermined limit value. Furthermore, the resource controller is configured to decrement or increment the counters for all requests 7 (FIG. 3) in the queue which have been a longer time in the queue than the request 7 (FIG. 3) which is served, each time a request 7 (FIG. 3) is served.

The resource controller 4 for controlling requests 7 (FIG. 3) to a shared electronic resource 3, which resource controller and shared electronic resource are shown in FIG. 2 may also be described as comprising a receiving unit 41 for receiving requests 7 (FIG. 3) of at least a first category, a determining unit 42 to determine whether the request 7 (FIG. 3) is to be served immediately or to be arranged in a queue, an arranging unit 43 to arrange the requests 7 (FIG. 3) in a queue in dependence of the determination made by the determining unit 42. The arranging unit 43 is configured to arrange the requests 7 (FIG. 3) in the queue together with a counter 9 (FIG. 3) which is set to a predetermined start value. The resource controller 4 also comprises a serving unit 44 to serve the requests 7 (FIG. 3) in an order chosen to take account of the number of requests 7 (FIG. 3) that are served per time unit. The resource controller 4 also comprises a counting unit 46 which decrement or increment the counters for all requests in the queue which have been a longer time in the queue than the request which is served, each time a request 7 (FIG. 3) is served. The serving unit 44 serves the request 7 (FIG. 3) which has been in the queue for the longest time of the requests in the queue when the counter of, the request 7, which has been in the queue for the longest time, has reached a predetermined limit value.

According to an embodiment FIG. 2 shows schematically an electronic processing device or User Equipment (UE) 1 which comprises a resource controller 4 in the form of a DRAM controller for controlling requests to a shared electronic resource. The UE 1 comprises a processor 2 and a shared electronic resource in the form of a memory 3 which in the shown embodiment is a Dynamic Random Access Memory (DRAM). The processor 2 is arranged on the same chip as the resource controller in the form of a DRAM controller 4. The electronic processing device 1 also comprises a number of data units 5, which in the shown embodiment also are arranged on the same chip as the processor. The data units 5 and the processor 2 are connected to the DRAM controller 4 with a data bus 6. The data units 5 benefit from a latency-rate guarantee. When the data units 5 require data from the memory 3 they send memory requests over the data bus 6 to the DRAM controller 4. The memory requests are received by the DRAM controller 4. The DRAM controller 4 may comprise a receiving unit 41 for the reception of the requests. The DRAM controller 4, possibly a determining unit 42 in the DRAM controller 4, determines whether the received request is to be served immediately or to be arranged in a queue. In case the request is to be arranged in a queue, the DRAM controller 4 arranges the received request inside the DRAM controller 4, which may be in an arranging unit 43 in the DRAM controller 4. The DRAM controller 4 selects which request to serve. This may be performed by a serving unit 44 in the DRAM controller 4. The DRAM controller 4 or a conversion unit 45 in the DRAM controller converts memory requests to sequences of DDR commands and every clock cycle it selects which DDR command to issue to the DRAM, adhering to the DDR standard. To achieve high efficiency of the DDR interface, which is an expensive resource, the order of DDR commands is not the same as the arrival order of the corresponding memory requests. Thus, the requests are served in a different order than their order of reception. A counter mechanism implemented in the DRAM controller, possibly as a counter unit 46, makes sure that the re-ordering is limited for a category of traffic flows that should be given a latency-rate guarantee. The counter mechanism will be described in more detail with reference to FIG. 3 below. Traffic flows of other categories may have unlimited re-ordering, or no re-ordering at all, dependent on their requirements. The following description will focus on one traffic category and the re-ordering of requests of that traffic category.

Resource controllers, such as DRAM controllers, may arrange resource requests, such as memory requests, in one or more queues in their original form or decomposed into smaller sliced resource requests, such as memory requests. In the case of memory requests an original memory request corresponds to one or more DDR bursts. A sliced request corresponds to one DDR burst. In the following description sliced requests will be called requests while composed requests are to be understood as comprising at least two requests. Data transfer of one DDR burst is initiated by a RD or WR command. RD and WR commands can only be issued if the addressed row in the addressed bank is open. A PRE command closes a bank and an ACT command opens one row in a bank. ACT and PRE commands may be necessary before a RD or WR command may be issued, dependent on the state of the addressed bank in the DRAM. A DRAM consists of multiple banks and commands to different banks may be interleaved. Therefore it is typically advantageous for the efficiency to re-order and interleave the DDR commands corresponding to different memory requests.

The counter mechanism makes sure that only a limited number of DDR bursts can overtake any request within a traffic category. It allows for latency-rate guarantee per traffic flow in combination with high efficiency.

Figure 3:
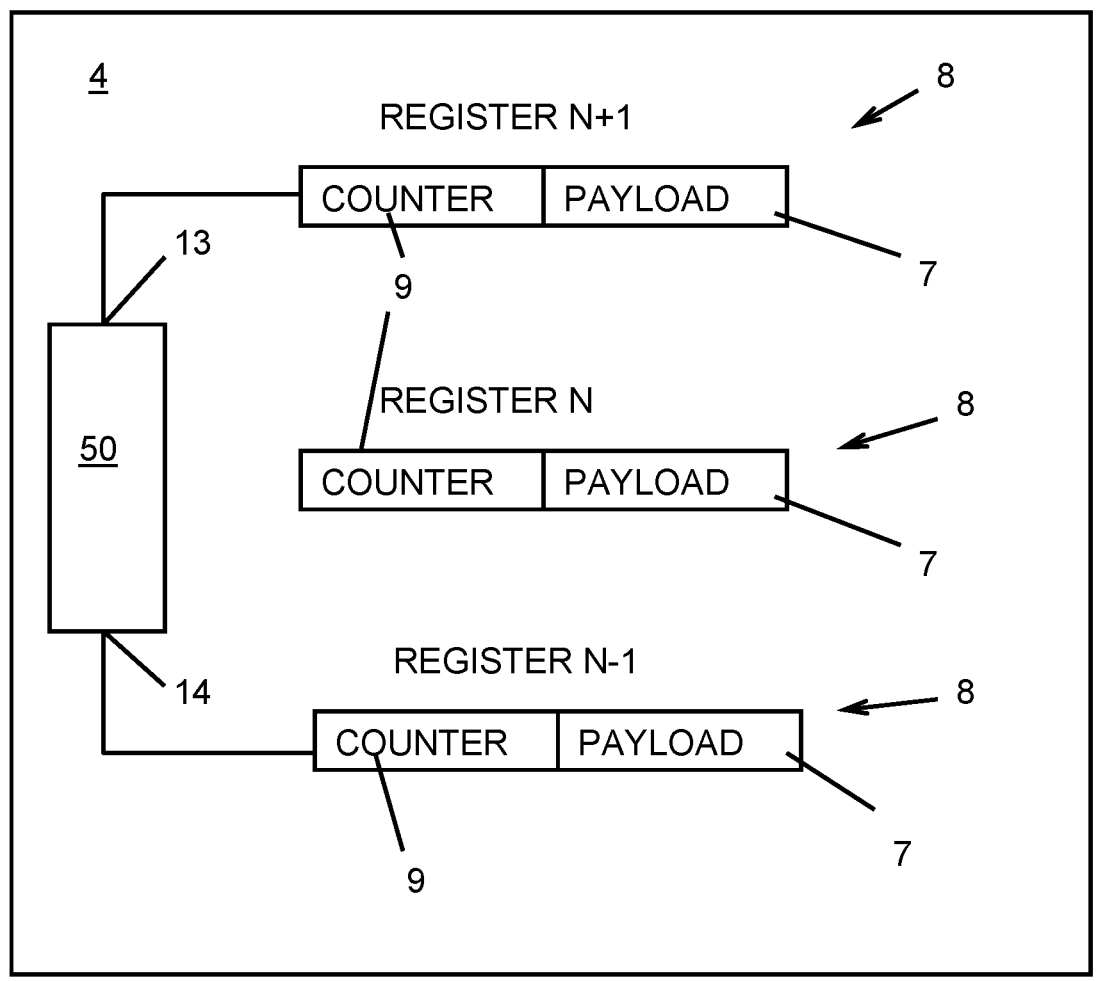
FIG. 3 illustrates schematically the storage of requests in a queue according to the method in FIG. 1.

FIG. 3 illustrates schematically the storage of requests in a queue according to the method and the controller in FIG. 1 and FIG. 2. Memory requests are arranged as payload 7 together with a corresponding counter 9 in queue posts 8 in a queue. The, resource controller, such as the DRAM controller 4, controls the queue posts and keeps track on how many queue posts that are arranged in the queue and their positions in the queue. A control unit 50 within the DRAM controller 4 controls the queue as is illustrated by lines 13 and 14. The most recently received memory request is arranged in queue post N+1 together with a counter 9 which is set to a predetermined start value. The request to be served is chosen from the requests in the queue. In case the request in queue post N−1 is chosen the queue post is deleted after the request has been served. As this queue post is the one that has been in the queue for the longest time, no decrement of any counters has to be performed. However, in case the request in queue post N+1 is chosen the counters in queue posts N and N−1 is decremented. In case the counter in queue post N−1 is equal to the predetermined limit value the request in queue post N−1 is chosen to be served. Even if only 3 queue posts are shown in FIG. 3 it is of course possible according to the disclosure to have more than 3 queue posts. The number N means that it is an arbitrary queue post. The number of queue posts that are used may be chosen dynamically over time and may be in the interval 1-1000 queue posts, and typically 10-100 queue posts.

Figure 4:
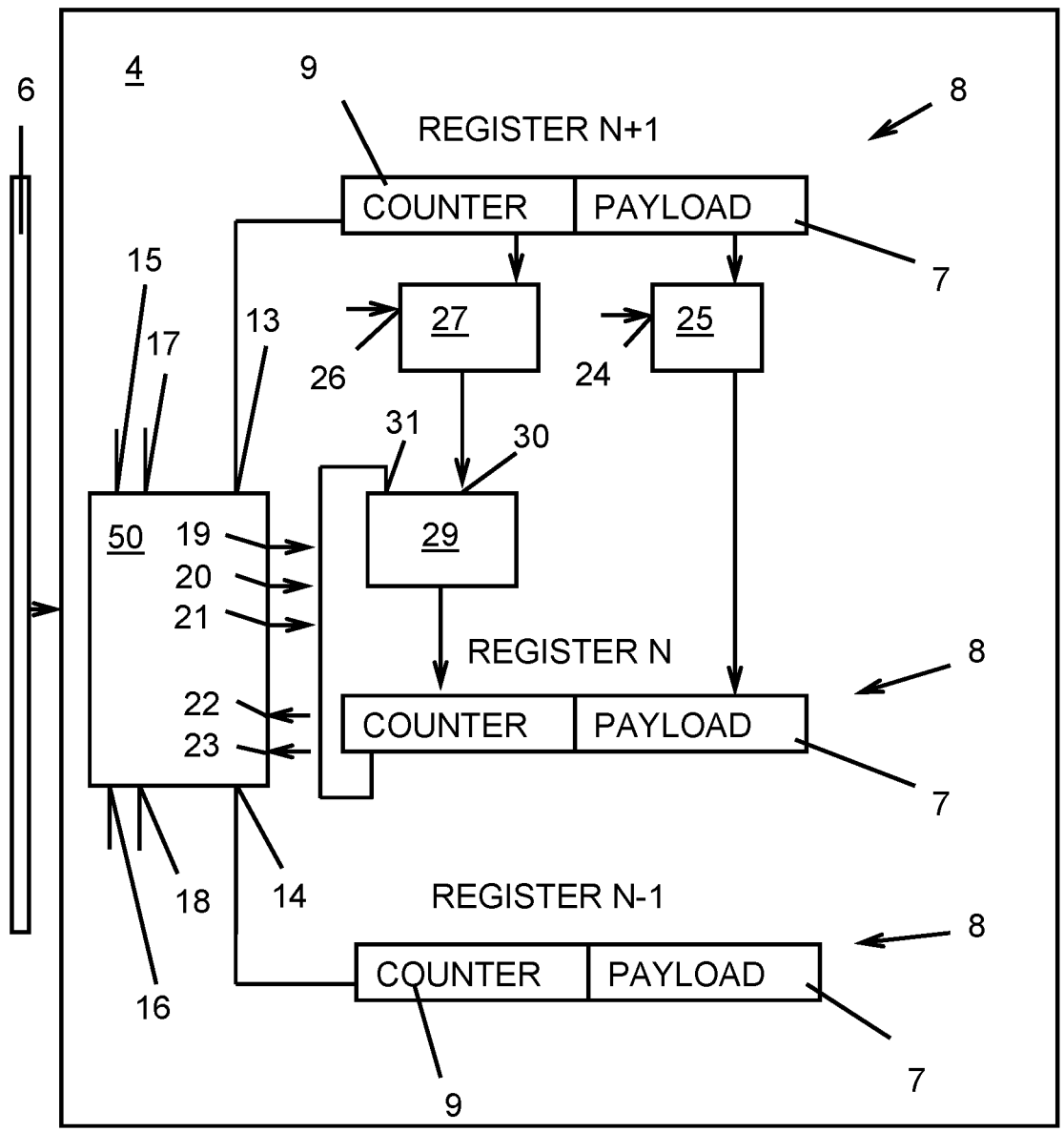
FIG. 4 illustrates in more detail the storage of requests in a queue according to FIG. 1.

FIG. 4 illustrates in more detail the storage of memory requests in a queue. The method will be described with requests. However, the method may also be implemented for composed requests. Memory requests arrive at to the DRAM controller 4 over the bus 6. The DRAM controller 4 receives the memory requests and the control unit 50 arrange them in a queue of queue posts 8. Each memory request 7 is arranged as payload in a queue post 8 together with a counter 9 which functions to limit the reordering in the queue. The request which have been in the queue for the longest time is arranged in queue post N−1 at the bottom of the drawing. The most recently received request in the queue is arranged in queue post N+1 in the top of the figure. The DRAM controller 4 keeps track of the queue positions of the ends of the queue via the top end input 13, and the bottom end input 14. The DRAM controller 4 comprises pop ports 15, 16 and grant ports 17, 18, for controlling a pop in the queue, i.e., to move a queue post upwards when a queue post above is served. The DRAM controller 4 also comprises a load output 19, a shift output 20, a decrement output 21, and a grant input 22 for granting the service of a specific queue post and an input 23 for queue post number for the queue post to be granted.

When a request is to be arranged in queue post N, the request enters on a load input 24 of a payload unit 25. The start value of the counter enters on a load input 26 of a counter unit 27. The request 7 and the counter 9 are arranged in queue post N. A later received request is arranged in queue post N+1.

When an RD command is issued for the memory request in queue post N the queue post N is deleted and a shift command is issued which causes the payload of queue post N+1 to move to queue post N via the payload unit 25. The counter in queue post N+1 is moved to queue post N via the counter unit 27 and a shift/decrement unit 29. The shift/decrement unit has two inputs namely a shift input 30, which is used to shift counter values without a decrement, and a decrement input 31 which is used when the counter is to be decremented. Furthermore, the information regarding the end of the queue is updated.

When an RD command is issued for the memory request 7 in queue post N+1 the queue post is deleted. The shift output 20 also outputs an instruction to decrement the counters of queue posts N and N−1. To this end the counter value of queue post N is input on the decrement input 31 of shift/decrement unit 29. The decremented value is then input as a new counter value. The same procedure is made for queue post N−1.

The counter 9 of a request is decremented by one when an RD or a WR command is issued to the DRAM corresponding to a request that has been in the queue for a shorter time. Thereby the counter 9 of the request, which has been in the queue for the longest time, is always the lowest. When the counter 9 of the request, which has been in the queue for the longest time, has reached a negative value (the most significant bit is high), no more memory requests are allowed to overtake it. Memory requests are therefore excluded from being chosen to be processed. This exclusion process is usually called masking.

The described counter mechanism allows combination of high efficiency and real-time guarantees in the form of latency-rate service guarantees per individual traffic flow. The silicon area necessary for implementation of the counter mechanism and the power consumption of the counter mechanism is low.

Above, the method has been described for one queue. It is, however, to be understood that each traffic category may have a queue of its own. The counter mechanism described above is implemented only for the traffic category that should be given a latency-rate guarantee and it is assumed that the traffic category as a whole is guaranteed latency-rate service. That can be done in many ways known to persons skilled in the art.

By providing a latency-rate guarantee for an individual traffic flow, the required size of local buffers to avoid buffer overflow, buffer underflow, or master stall time can be computed according to network calculus. The DRAM controller communicates with the DRAM over a DRAM controller interface (DDRx SDRAM interface). The described method and controller provides for a high efficiency of the DRAM controller interface (DDRx SDRAM interface). High efficiency of the DRAM controller interface allows for lower clock frequency and/or narrower DRAM controller interface, i.e., a DRAM controller interface having a lower capacity, saving area on the silicon chip on which the DRAM controller is arranged, power consumption, and board area. Alternatively high efficiency of the DRAM controller interface (DDRx SDRAM interface) allows for more advanced algorithms and higher capacity specification for a given system.

The counter may be counted up instead of down for each WR or RD command and the predetermined start value and the predetermined limit value of the counter may be defined in a different way than has been done above. The commands from requests other than the one which has been in the queue for the longest time, may be stopped from being sent to the DRAM in any way. Examples on methods that may be used to stop requests from being sent to the DRAM include request masking, command masking, and arbiter control. Masking is well known to persons skilled in the art and is the process of de-identifying (masking) specific data elements within a data file. An arbiter is like a traffic officer at an intersection who decides which car may pass through next. Given only one request, an arbiter promptly permits the corresponding action, delaying any second request until the first action is completed. When an arbiter gets two requests at once, it must decide which request to grant first. The arbiter guarantees that there are never two actions under way at once, just as the traffic officer prevents accidents by ensuring that there are never two cars passing through the intersection on a collision course.

The described embodiments may be amended in many ways.

The overtake counter mechanism can potentially be used for any shared electronic resource, but it is described here mainly for a DDR interface of a DRAM controller. The DDR standards put specific requirements on the command sequences that make it hard to combine high efficiency, latency differentiation, and real-time guarantees. Other shared resources may have at least partially different standards and/or requirements that may be handled using the method and controller described herein.

The invention claimed is:

1. A method for controlling requests to a shared electronic resource comprises:
  receiving requests of at least a first category;
  determining whether each request is to be served immediately or to be arranged in a queue;
  arranging the requests in the queue, together with a counter, which is set to a predetermined start value, based on the determination that the request is to be served immediately or arranged in the queue, for each request arranged in the queue;
  serving the requests in an order based on a number of requests that are served per time unit, wherein the request which has been in the queue for the longest time of the requests in the queue is served when the counter of that request has reached a predetermined limit value; and
  decrementing or incrementing the counters for all requests in the queue which have been a longer time in the queue than the request that is served, each time any of the requests is served.

2. The method according to claim 1, wherein the requests are served in an order based on a number of commands necessary to process the requests in the queue.

3. The method according to claim 1, wherein the requests arrive as parts of composed requests and wherein the method further comprises dividing the composed requests into requests when the composed requests are received.

4. The method according to claim 1, wherein each time any of the requests is served, the counter is decremented for each one of the requests which have been in the queue for a longer time than the request which is served.

5. The method according to claim 4, wherein the counter is represented by a multi-bit number of which the most significant bit determines that the number is negative when it is high, and wherein the predetermined limit value is any negative number.

6. The method according to claim 1, wherein the resource is a memory and the requests are memory requests.

7. The method according to claim 6, wherein the memory is a Dynamic Random Access Memory (DRAM).

8. The method according to claim 7, wherein the requests are processed in an order which minimizes the number of activate (ACT) and/or precharge (PRE) commands.

9. The method according to claim 1, wherein the first category of requests corresponds to requests from a display controller.

10. The method according to claim 1, wherein the queue is arranged in an electronic processing device.

11. A resource controller for controlling requests to a shared electronic resource, wherein the resource controller is configured to:
  receive requests of at least a first category;
  determine whether each request is to be served immediately or to be arranged in a queue;
  arrange the requests in the queue, together with a counter, which is set to a predetermined start value, based on the determination that the request is to be served immediately or arranged in the queue, for each request arranged in the queue;
  serve the requests in an order based on a number of requests that are served per time unit, wherein the request which has been in the queue for the longest time of the requests in the queue when the counter of that request has reached a predetermined limit value; and
  decrement or increment the counters for all requests in the queue which have been a longer time in the queue than the request which is served, each time any of the requests is served.

12. The resource controller according to claim 11, wherein the resource controller is configured to serve the requests in an order based on a number of commands necessary to process the requests in the queue.

13. The resource controller according to claim 11, wherein the requests arrive as parts of composed requests and wherein the resource controller is configured to divide the composed requests into requests when the composed requests are received.

14. The resource controller according to claim 11, wherein each any request is served, the resource controller is configured to decrement the counter for each one of the requests which have been in the queue for a longer time than the request which is served.

15. The resource controller according to claim 14, wherein the counter is configured to be represented by a multi-bit number of which the most significant bit determines that the number is negative when it is high, and wherein the predetermined limit value is any negative number.

16. The resource controller according to claim 11, wherein the resource is a memory and the requests are memory requests.

17. The resource controller according to claim 16, wherein the memory is a Dynamic Random Access Memory (DRAM).

18. The resource controller according to claim 17, wherein the requests are served in an order which minimizes the number of activate (ACT) and precharge (PRE) commands.

19. A user equipment comprising a resource controller according to claim 11.

* * * * *